INVENTOR
ASHLEY C. GLENN

BY
Howard ...
John F. Verhoeven
ATTORNEYS

June 8, 1965        A. C. GLENN        3,187,601

MOTION TRANSMITTING MECHANISM

Filed April 1, 1963        4 Sheets-Sheet 3

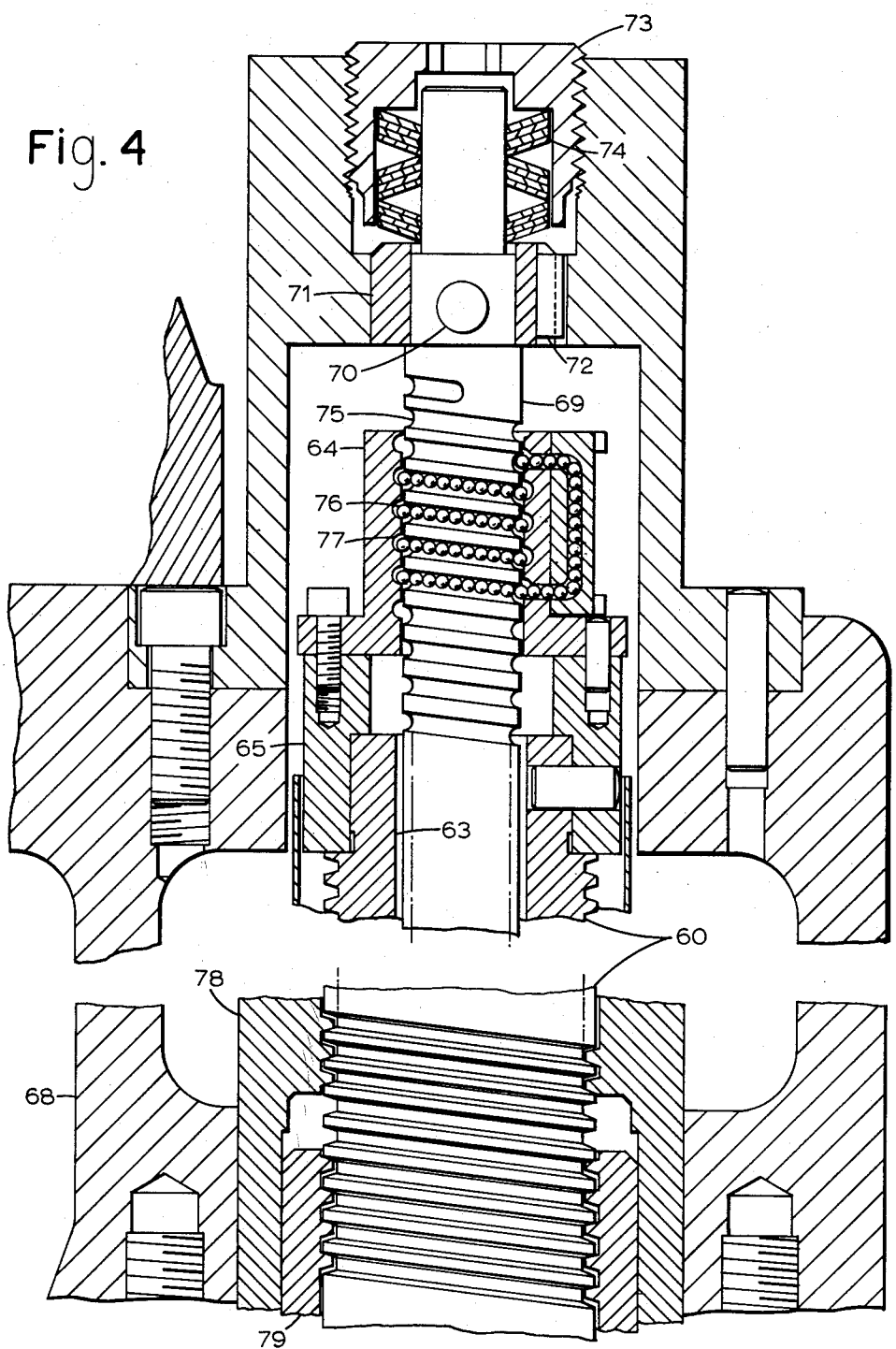

United States Patent Office 3,187,601
Patented June 8, 1965

3,187,601
MOTION TRANSMITTING MECHANISM
Ashley C. Glenn, Cincinnati, Ohio, assignor to The Cincinnati Milling Machine Co., Cincinnati, Ohio, a corporation of Ohio
Filed Apr. 1, 1963, Ser. No. 269,292
13 Claims. (Cl. 74—424.8)

The present invention relates to motion transmitting mechanism particularly suitable for lifting and supporting a heavy slide in a machine tool.

The use of a nut in conjunction with a screw threadedly received in the nut to effect, on relative rotation between the screw and the nut, relative linear movement between two members which are connected, respectively, to the screw and nut, is common in machine tool construction. Some screw and nut connections, such as threaded connections, offer high resistance to relative rotation between the screw and the nut, particularly when a large force is transmitted through the screw and nut connection. This type of high friction connection has the disadvantage of requiring a high torque to effect relative rotation between the screw and nut for producing the desired relative linear motion between the machine tool members. However, the high resistance to relative rotation between the screw and nut in this type of screw and nut connection has the advantage of resisting undesired relative rotation between the screw and nut (and hence undesired motion between the machine tool members) when a force is applied to one of said machine tool members.

Other types of screw and nut connections, such as one comprising a ball screw received in a ball nut, offer low resistance to relative rotation between the screw and nut, and relative rotation between the screw and nut to effect the desired relative linear movement between the machine tool members can be produced with considerably less torque than required for the threaded screw and nut connection. However, the low resistance to relative rotation between the screw and nut connection in this type of screw and nut connection offers little resistance to undesired relative rotation between the screw and nut (and undesired movement between the machine tool members) when a force is applied to one of the members.

In the present invention two screw and nut connections are provided between two members, one offering high resistance and the other low resistance to relative rotation between the screw and nut. These screw and nut connections, which have the same lead, are connected between the two members, such as a machine tool base and slide, to effect relative movement therebetween. The force required to effect relative movement between the members is transmitted through both screw and nut connections so that each bears a portion of the load. To the extent the screw and nut connection offering low resistance to relative rotation between the screw and nut bears the load, the torque required to move the load will be reduced. To the extent the screw and nut connection offering high resistance to relative rotation between the screw and nut bears the load, resistance to undesired movement between the members will be provided. With the present invention, a combination of values of torque requirement and resistance to undesired movement can be obtained which is not available in any single screw and nut connection. Preferably, the ratio of the load borne by the two screw and nut connections is adjustable so that the most satisfactory compromise between torque required and resistance to undesired movement can be obtained for the particular installation.

The present invention is particularly suitable for moving and supporting a heavy slide guided for vertical movement where a threaded screw and nut connection, alone, would require excessive torque to raise the slide, and a ball screw and nut connection, alone, would, unless the slide were clamped, overhaul (that is, the weight applied by the slide to the screw and nut connection would cause undesired relative rotation between the screw and nut and the slide would descend).

In the preferred form of the invention for this type of installation, the threaded screw, which has a bore at its upper end, is journaled in the base and has a ball nut secured to the upper end thereof. A ball screw, mounted in the slide, extends into the bore of the threaded screw through the ball nut. A threaded nut, also carried by the slide, is received on the threaded screw, and rotation of the threaded screw, which effects rotation of the ball nut, raises the slide. Both screw and nut connections support the load defined by the slide, and the ratio between the portions carried by each can be adjusted for a low, or minimum, torque requirement to rotate the threaded screw without encountering overhaul when the slide has been raised. The load ratio adjustment is effected through a spring interposed between the ball screw and the slide which, once a desired adjustment is made, tends to keep the load carried by the ball screw and nut constant, thereby keeping the selected load distribution between the two screw and nut connections constant. By telescoping the ball screw and threaded screw, a compact construction providing a large range of movement of the slide is provided.

It is therefore one object of the present invention to provide an improved motion transmitting mechanism for relative movement between two members with a desirable torque requirement and adequate resistance to undesired movement.

It is another object of the present invention to provide an improved motion transmitting mechanism for relative movement between two members in which the combination of values for torque required and resistance to undesired movement is adjustable.

It is another object of the present invention to provide mechanism for raising a vertically guided slide with minimum torque requirement and for supporting the slide without overhaul.

It is yet another object of the present invention to provide a motion transmitting mechanism where the force required to effect relative movement between two machine tool members is transmitted through both a friction screw and nut connection and an antifriction screw and nut connection.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:

FIG. 4 is an enlarged view showing portions of the construction of FIG. 3 in more detail.

Figure 1:
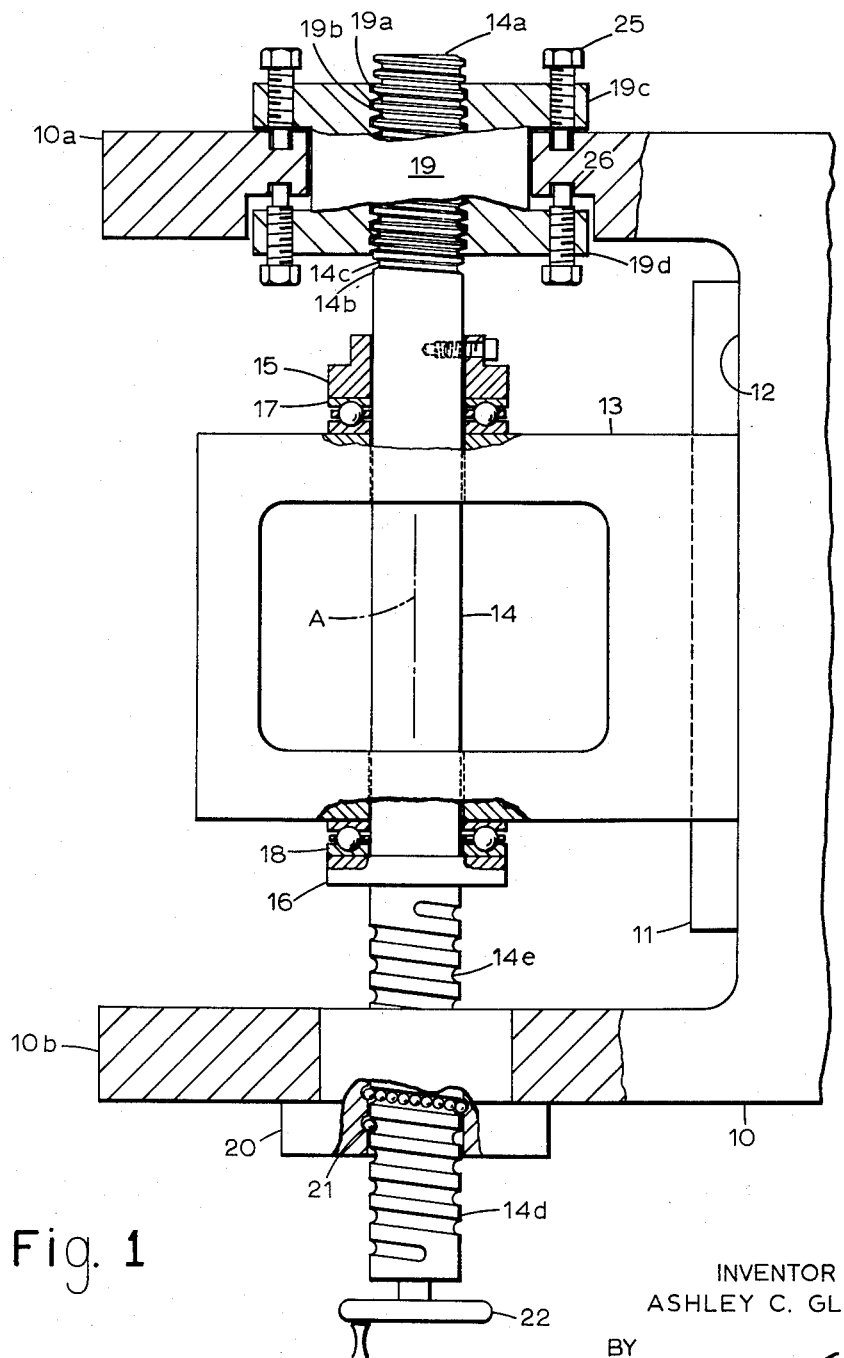
FIG. 1 is a view in elevation showing a simple form of the present invention for vertical movement of a slide.

There is shown in FIG. 1 a machine tool having a base member 10 with a vertical, dovetail guide 11 and vertical ways 12 for guiding slide member 13 in linear vertical movement relative to the base member 10. The slide member 13 has a vertical screw 14 journaled thereon, on axis A, and held against axial movement relative thereto by collars 15, 16 and by thrust bearings 17, 18 interposed between the collars and the slide member. The base member has two arms, 10a and 10b, extending horizontally in spaced relation to straddle the slide member 13. The upper end of screw 14 has a threaded portion 14a with a helical external thread 14b thereon defining a thread groove 14c. The upper arm 10a has a threaded nut 19 received thereon, on axis A, the nut 19 having a helical internal thread 19a defining a thread groove 19b. The nut 19 is in threaded engagement with screw portion 14a which is received in the nut. The screw portion 14a and nut 19, since the threads thereof are in sliding contact when relative rotation is effected therebetween, may be considered, respectively, a friction screw portion and friction nut defining a friction screw and nut connection. The lower end of screw 14 has a portion 14d with ball groove 14e thereon, and the lower arm 10b has a ball nut 20 secured thereon, on axis A, through which the screw portion 14d extends for engagement with nut 20 through balls 21 of the nut. Since screw portion 14d and nut 20 are engaged through members 21 which roll on relative rotation between the screw portion and nut, the screw portion and nut may be considered, respectively, as an antifriction screw portion and an antifriction nut defining an antifriction screw and nut connection. A handwheel 22 is secured to the lower end of screw 14 for rotation thereof.

Although it is not necessary that the pitch (that is, the axial distance between the turns of the groove or thread) be the same on screw portions 14a and 14d (since screw portion 14a may have a different number of thread grooves than the number of ball grooves on screw portion 14d), it is necessary that the lead (that is, axial movement of the screw on one revolution thereof) be the same for the two screw portions. For illustrative purposes, each screw portion is shown with a single groove. Both the thread and the groove portions on the screw must be the same hand, so that, on rotation of screw 14 in a given direction, axial movement in the same direction will be imparted to both screw portions.

Thus, the base member 10 and slide member 13 are connected through two screw and nut connections, a threaded screw and nut connection (that is, a sliding connection) defined by screw portion 14a and nut 19 (which because of the friction between the sliding threads, offers a relatively high resistance to relative rotation therebetween when subjected to a load), and a ball screw and nut connection (that is, a rolling connection) defined by screw portion 14d and nut 20 (which, because of the rolling members 21, offers a relatively low resistance to relative rotation therebetween when subjected to a load). The weight of the slide 13 defines a downwardly acting force, or load, which is transmitted through the screw 14 to nuts 19 and 20, and from nuts 19 and 20 to base member 10. The proportion of the weight borne by nut 19, and hence the proportion of the weight borne by nut 20 (since the nuts 19 and 20 must at all times support the full weight of the slide) can be altered by vertical adjustment of nut 19. Nut 19 has four studs 25 threadedly received through end flanges 19c and 19d of the nut. The studs 25 are received in holes 26 in the arm 10a to prevent rotation of the nut, and, by adjustment of studs 25, axial shifting of nut 19 can be effected. Raising nut 19 increases the force transmitted between the threads of the screw portion 14a and the nut 19, and hence decreases the force transmitted through the balls of nut 20; lowering nut 19 decreases the force transmitted between the threads of the screw portion 14a and the nut 19, and hence increases the force transmitted through the balls of nut 20. Nut 19 can be raised high enough to lift screw 14 off the balls of nut 20 (in which case nut 19 bears the full weight of the load and ball nut 20 bears none of the load) or, conversely, nut 19 can be lowered enough to drop the full weight of the load onto the balls of nut 20 so that nut 19 supports none of the load. Between these two extreme limits, the load will be distributed between the two nuts in a ratio depending on the axial position of nut 19. It will be noted that raising or lowering nut 19 (to increase or decrease the load transmitted through the threads 19a, 14b of the nut 19 and screw portion 14a, respectively) deflects the threads to a greater or lesser extent, and hence there will be a minute relative axial adjustment between the screw portion 14a and nut 19 whenever the axial position of the nut 19 is adjusted. Thus, the distribution of the load between the two screw and nut connections is altered by an axial adjustment of the nut relative to the screw portion received therein. To state it another way, the distribution of the load is altered by changing the span (that is, the axial distance) between the two nuts 19 and 20 while the axial span between the two screw portions 14a and 14d remains fixed.

The use of two screw and nut connections to move and support a load, one offering high resistance and the other low resistance to relative rotation between the screw and nut, will permit selection of a desired compromise between torque requirement and resistance to overhaul as can be demonstrated with well known power screw equations (see, for example, M. F. Spotts, Design of Machine Elements, second edition). The torque required to raise a load $W_T$ which is supported solely by a threaded screw and nut connection is $$T = r_t W_T \left[ \frac{\cos \theta_n \tan \alpha + \mu}{\cos \theta_n - \mu \tan \alpha} \right]$$

where $r_t$ is the pitch radius of the screw thread, $\alpha$ is the helix angle of the thread, $\theta_n$ (for standard screws having small values for the helix angle $\alpha$) is substantially one-half the thread angle, and $\mu$ is the coefficient of friction in the screw and nut connection. For a threaded screw and nut connection alone, with an Acme thread (thread angle 29.0 degrees) of .250 pitch and lead, a pitch radius of 1.125 inches, and a coefficient of friction of .12, $$T = .180 \, W_T \text{ inch-pounds}$$

For a frictionless screw and nut connection, which is closely approximated by the ball screw and nut, the torque to raise a load $W_B$ is $$T = r_t W_B \tan \alpha$$

and, with the same pitch radius and helix angle as the threaded screw and nut connection, $$T = .040 \, W_B \text{ inch-pounds}$$

or less than one quarter the torque required to raise an equal load through the threaded connection.

For a threaded connection alone, the torque required to lower the load $W_T$ (which is equal in magnitude to the torque resisting overhaul) is $$T = r_t W_T \left[ -\frac{\cos \theta_n \tan \alpha - \mu}{\cos \theta_n + \mu \tan \alpha} \right]$$

or, for the screw previously described, $$T = .099 \, W_T$$

With a frictionless screw and nut connection only, the weight of the load will cause relative rotation between the screw and the nut to produce overhaul, and will produce a torque $$T = r_t W_B \tan \alpha$$

which is the same in magnitude as the torque required to raise the load. For the screw taken for illustrative purposes, the torque produced by the weight of the load is $$T = .040 \, W_B \text{ inch-pounds}$$

The weight of the slide 13 is carried by the screw 14, and the load defined by the screw and slide is carried by nuts 19 and 20, the thread of screw portion 14a resting on the thread of nut 19 and the groove of screw portion 14b resting on the balls of nut 20. The total weight of the load $W_L$ must always equal the sum of the weight $W_T$ supported by nut 19 and the weight $W_B$ supported by the balls of nut 20. However, any selected distribution of the weight $W_L$ between the threaded screw and nut connection and the ball screw and nut connection can be effected by vertical adjustment of nut 19. For example, nut 19 can be adjusted to provide for a minimum torque requirement to raise the load without encountering overhauling. Under these requirements, after the load is raised, the magnitude of the torque resisting overhaul in the threaded screw and nut connection must equal the magnitude of the torque produced by the weight of the load in the ball screw and nut connection, or $$.099\ W_T = .040\ W_B$$

and $$W_L = W_T + W_B$$

These equations indicate that when $$W_B = .712\ W_L$$

and $$W_T = .288\ W_L$$

the weight supported by the high resistance threaded screw and nut connection is as small as possible without encountering overhaul. With this minimum torque with no overhaul condition, the torque required to raise a load $W_L$ is $$T = .080\ W_L$$

while, if the load $W_L$ were supported solely by a threaded screw and nut connection with parameters previously described, or solely by two or more threaded screw and nut connections with these parameters, the torque required to raise the load $W_L$ would be $$T = .180\ W_L$$

more than double the minimum torque requirement with no overhaul made possible by the present invention. If the load were supported solely by one or more ball screw and nut connections, there would be overhaul and the load would descend unless braked.

Figure 2:
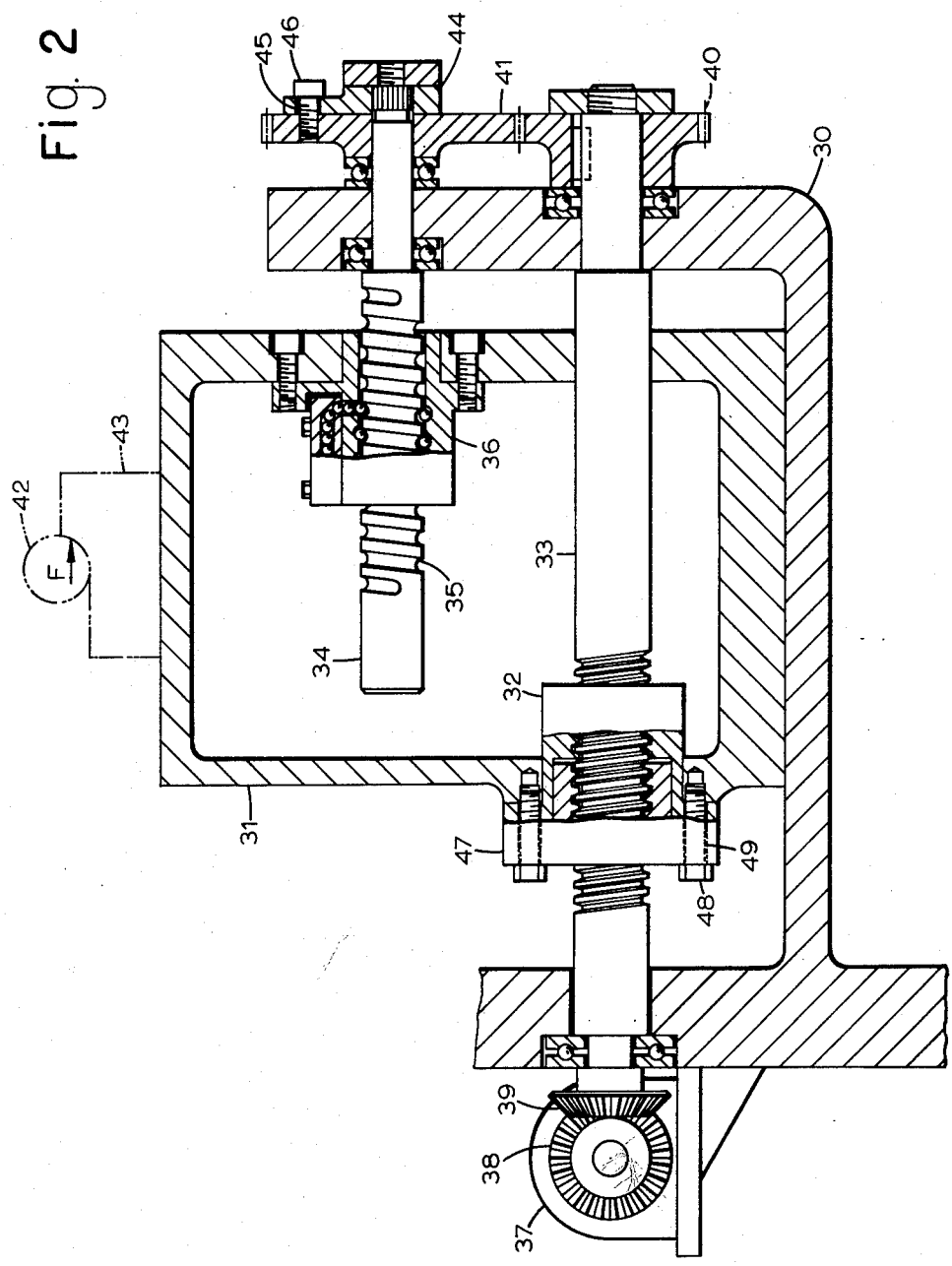
FIG. 2 is a cross-sectional view showing another embodiment of the present invention adapted for horizontal movement of a machine tool member.

In the embodiment of the invention shown in FIG. 2, a base member 30 has a table 31 mounted thereon for horizontal movement. The table has a first drive nut 32 secured therein which is threaded to receive a horizontal threaded drive screw 33 journaled in the base member. A second drive screw 34, parallel to screw 33, is also journaled in base member 30 and has a helical ball groove 35 thereon. Screw 34 is received in ball nut 36 secured in table 31. Thus the table 31 is connected to the base 30 through two sets of complementary screw and nut members, one set comprising the threaded screw member 33 and the threaded nut member 32 engaged therewith, and the other set comprising the ball screw member 34 and the ball nut member 36 engaged therewith.

Screw 33 is driven from motor 37 through bevel gears 38, 39, and screw 34 is driven in unison with screw 33 through gears 40, 41 connecting the two screws. When motor 37 is driven in a direction to move table 31 to the left in FIG. 2, this movement is resisted by the rotating cutter 42 engaged with workpiece 43 mounted on the table. This resistance constitutes a force, or load, F acting to the right on the table which is transmitted through both the threaded screw and nut connection defined by screw 33 and nut 32 and the ball screw and nut connection defined by screw 34 and ball nut 36. The distribution of the load between the threaded connection and the ball connection is adjusted by increasing or decreasing the amount of the load transmitted through the balls of the ball nut 36. A lever 44 is splined to screw 34 and has an arcuate slot 45 through which screw 46, secured in gear 41, is received. When screw 46 is loosened, screw 34 can be rotated relative to gear 41, and hence relative to screw 33. Since screw 33 holds table 31 and nut 36 fixed, rotation of screw 34 effects an axial adjustment thereof relative to nut 36 (without corresponding axial movement of screw 33) so that a greater proportion of the load (if screw 34 shifted axially to the left) or a lesser proportion of the load (if screw 34 shifted axially to the right) is borne by the balls of nut 36.

In the embodiment shown in FIG. 2, the leads on the screws 33, 34 will be the same only if the diameter of gears 40, 41 are the same; if the diameters of the gears 40, 41 are not the same, the leads on screws 34 and 33 must be inversely proportional to the diameters of the gears on the respective screws. In other words, one revolution of shaft 33 must cause the same axial movement of nut 36 as of nut 32. For example, if the diameter of gear 41 on shaft 34 is twice the diameter of gear 40 on shaft 33, shaft 34 will rotate one-half revolution for each revolution of shaft 33 and the lead on shaft 34 must be twice the lead on shaft 33. Since the two shafts rotate in opposite directions, the thread (or groove) on one shaft will be left-hand while on the other shaft right-hand.

In the embodiment shown in FIG. 2, an additional nut 47 is shown secured in table 31 and received on threaded shaft 33. The nut 47 can be rotated relative to nut 32 when the screws 48, which are received through arcuate slots 49 in nut 47, are loosened. Nut 47 is merely to minimize backlash between drive nut 32 and screw 33 in the same manner as a conventional anti-backlash nut. With the load acting to the right in FIG. 2, the proportion of the load carried by the screw and nut connection defined by nut 32 and screw 33 is transmitted through the right hand face of the thread on the nut 32 to the left hand face of the thread on the screw 33. The nut 47 is set with the left hand face of the thread on the nut 47 against the right hand face of the thread on the screw 33, but no force is transmitted through these faces when the screw 33 is driving table 31 to the left against force F. It will be noted that if the table were to be driven to the right against a force acting to the left, the force would act through nut 47 and nut 32 would define the anti-backlash nut. In this latter case, the screw 34 would be axially adjusted to share the load with nut 47.

Figure 3:
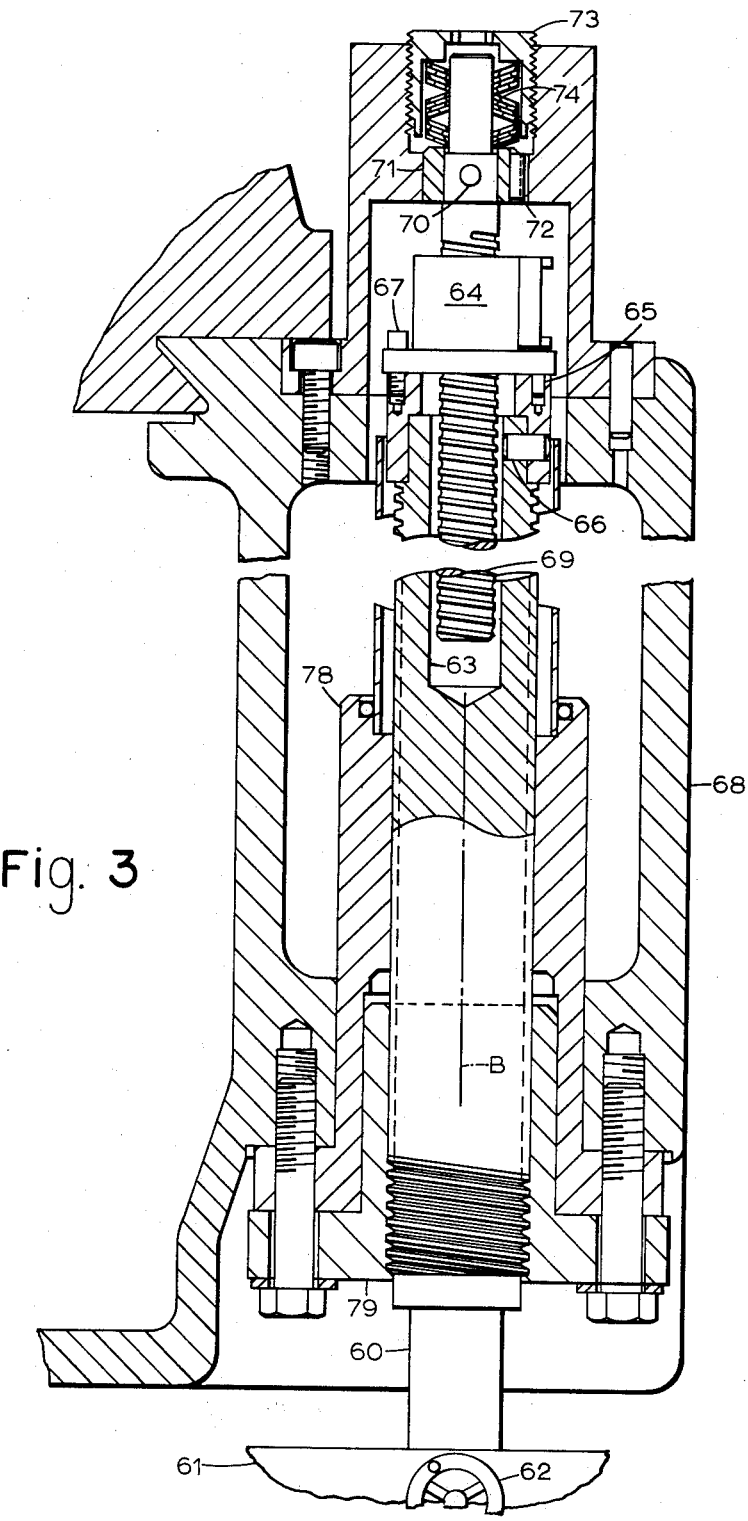
FIG. 3 is a cross-sectional view of the preferred form of the invention, adapted for lifting and supporting a heavy slide.

In the preferred form of the invention shown in FIGS. 3 and 4, a compact construction, permitting an extended range of linear movement of a slide, is provided. In this construction, a threaded screw 60 is journaled in base 61, for rotation on axis B by a handwheel 62 connected to screw 60, with the screw 60 held against axial movement in the base. The screw 60, which extends vertically upwardly from base 61, has an internal bore 63 on axis B extending from its upper end. A ball nut 64, having balls 76, is mounted on the upper end of the screw 60 on axis B for rotation therewith. The nut 64 is secured to screw 60 by means of a sleeve 65 pinned to the screw 60 at 66, and by means of screws 67 attaching the nut 64 to the sleeve 65.

A heavy slide 68, guided for vertical movement (similarly to the slide 15 in FIG. 1) by vertical guides (not shown) has a vertical ball screw 69 slidably received therein which extends downwardly through ball nut 64 and into the internal bore 63 of screw 60. The screw 69 is pinned at 70 to a sleeve 71 which is keyed at 72 to slide 68 for axial movement relative to slide 68 without rotation. The slide 68 has a cap 73 threadedly received therein over screw 69, and a spring 74 is interposed between the cap 73 and the sleeve 71 pinned to screw 69. It will thus be seen that, because of the weight of the slide, a force is transmitted through cap 73, spring 74, sleeve 71, pin 70, to screw 69. As shown best in FIG. 4, the groove 75 of screw 69 rests on the balls 76 which, in turn, rest on the groove 77 of ball nut 64. Thus the weight carried by screw 69 is transmitted through the balls 76 to the nut 64, and through the threaded screw 60 to the base 61.

If the only connection between the slide 68 and the screw 60 were through the ball screw and nut connection defined by ball screw 69 and ball nut 64, the full weight of the slide would be borne by this connection, and axial adjustment of cap 73 would not vary the load transmitted to this ball connection. However, the slide has a threaded drive nut 78 secured therein which is in threaded engagement with screw 60 so that a portion of the load of the slide is borne by the screw and nut connection defined by screw 60 and threaded nut 78. It will be noted that the load transmitted through this screw and nut connection is transmitted from the lower face of the thread on the nut 78 (which rests on the thread on the screw) to the upper face of the thread on the screw 60. The anti-backlash nut 79, drawn up against the lower face of the screw thread, bears no portion of the load when the slide is being lifted and supported.

When the ball screw and nut connection defined by ball screw 69 and ball nut 64, and the threaded screw and nut connection defined by the threaded screw 60 and threaded nut 78, are each supporting part of the load, and the cap 73 is screwed downwardly in the slide 68 to increase the compression of the spring 74, the force between the cap 73 and sleeve 71 will increase, tending to lift the slide 68 and nut 78 thereof. This will decrease the force between the thread of nut 78 and the thread of screw 60, and since the total weight of the slide must be borne by the two screw and nut connections at all times, the force transmitted through the balls will be increased. Conversely, screwing cap 73 upwardly in slide 78 will diminish the proportion of the weight transmitted through the balls and will increase the proportion transmitted through the threaded screw and nut connection.

It will be noted that the compression of spring 74, by which a greater proportion of the weight is shifted to screw 69, causes a minute axial adjustment of screw 69 downwardly relative to nut 64, whereby a greater force is transmitted through the balls. At the same time, the compression of the spring 74 causes a minute axial adjustment of nut 78 upwardly relative to screw 60 whereby a lesser force is transmitted from the thread of the nut 78 to the thread of the screw 60. In other words, considering screw 60 and nut 64 (the members of the respective screw and nut connections to which the load is transmitted) to be mounted on base 61 and axially stationary at a constant fixed distance apart, the compression of spring 74 will change the axial span between the two members mounted on slide 68 (screw 69 and nut 78) from which the load is transmitted, thereby changing the distribution of the load between the two screw and nut connections. The same result would be achieved if the span between the two members of the screw and nut connections (nut 64 and screw 60) to which the load is transmitted were altered relative to the span between the two members (screw 69 and nut 78) through which the load is transmitted to the nut 64 and screw 60.

The leads on the two screws 60, 69 should be the same when the screws are supporting the slide. It should be noted, however, that screw 60 has different cross-sectional areas along its length, one or both of which will differ from the cross-sectional area of screw 69. Since the amount a screw compresses under load depends on its cross-sectional area, and since the load carried by screw 69 above nut 64 is at all times substantially the same as the load carried by screw 60 above nut 78, it is desirable, in manufacturing the screws, to modify the leads in accordance with the cross-sectional area of the screw so that, when the screws are installed under load, the leads will be more nearly equal than if the screws were manufactured with equal leads at no load.

Both screws are the same hand (that is, both left hand threads or both right hand threads) so that on simultaneous rotation of screw 60 and nut 64 by handwheel 62, the nut 78 and screw 69 will move simultaneously in the same direction to effect relative linear movement between slide 68 and base 61. In the lowermost position of the slide 68 (as shown in FIG. 3), nut 78 is at the lower end of screw 60, screw 69 is deep inside screw 60, and nut 64 is at the upper end of screw 69. As handwheel 62 is rotated to raise the slide, nut 78 rises on screw 60, and screw 69 rises in nut 64, rising out of bore 63. It will be noted that by telescoping the two coaxial screws so that screw 69 extends inside screw 60 as in the embodiment of FIGS. 3 and 4, the range of linear movement of slide 68 relative to base 61 is considerably increased over the range possible with a single screw of comparable length, as in the embodiment of FIG. 1, and the construction of FIGS. 3 and 4 is more compact than the use of two spaced apart parallel screws as in the embodiment of FIG. 2.

The use of spring 74 interposed between the screw 69 and slide 68 provides an advantage over the embodiments of FIGS. 1 and 2, where, once the adjustment for load distribution is made, the axial span between the screw and nut members from which the load is being transmitted (screw portions 14a, 14b in FIG. 1 and nuts 32, 36 in FIG. 2) remain constant and the axial span between the screw and nut members to which the load is being transmitted (nuts 19, 20 in FIG. 1 and screws 33, 34 in FIG. 2) remain constant. Assuming perfectly formed screws and nut, in the embodiments of FIGS. 1 and 2, the load distribution will remain constant but, if the lead on the threads or grooves vary due to inaccuracy in manufacture, the load distribution will fluctuate. This fluctuation of load distribution due to imperfections in the screw and nut connections is minimized by the spring in the embodiment of FIGS. 3 and 4. Screw 69 is not held fast in slide 68, but can slide therein so that the entire portion of the weight of the slide 68 to be supported by ball nut 64 is transmitted through spring 74. With any given setting of cap 73 (and assuming the weight of the slide constant) the weight transmitted by the spring to ball nut 64 will be substantially constant, despite any irregularities in the screws and nuts. Suppose, for example, that the threads of the threaded screw and nut connection defined by screw 60 and nut 78 were misformed to offer, at any particular time during the rotation of screw 60, less support than perfectly formed threads. With spring 74, the slide 68 would settle slightly, tending to maintain a portion of the load on the threaded screw and nut connection. In other words, the spring 74 tends to maintain a constant load on ball nut 64, and, since the total load of the slide remains constant, the spring tends to maintain a constant load distribution, despite any inaccuracy in the screw and nut connections.

What is claimed is:
1. In a machine tool, the combination comprising,
   (a) a first machine tool member having a screw journaled therein, said screw having two helical grooves of substantially equal lead and in axially spaced relation,
   (b) a second machine tool member having an antifriction nut and having a friction nut coaxial with the antifriction nut, said antifriction nut and friction nut received on said grooves, respectively, in axially spaced relation,
   (c) means to rotate the screw to transmit a load-defining force through said nuts and effecting relative movement between said machine tool members,
   (d) and means to adjust the axial spacing between said nuts to proportion the load between said nuts.
2. Motion transmitting mechanism comprising in combination
   (a) a first member and a second member,
   (b) two sets of complementary screw and nut members, one set comprising a friction screw member and a friction nut member engaged with the friction screw member and the other set comprising an antifriction screw member and an antifriction nut mem- ber engaged with the antifriction screw member, one of said screw and nut members from each set mounted in the first member and the other of said screw and nut members from said sets mounted in the second member, (c) and means to effect simultaneous relative rotation between said screws and nuts.

3. In a machine tool, the combination comprising (a) a first machine tool member having a friction screw and an antifriction screw journaled therein and geared together for simultaneous rotation in a predetermined ratio, the leads on said screws being inversely proportional to the ratio of rotation thereof, (b) a second machine tool member having a friction nut and an antifriction nut secured therein, said nuts receiving, respectively, the friction screw and the antifriction screw, (c) means to effect an angular adjustment of one screw relative to the other to produce an axial adjustment of said one screw to the nut in which it is received, (d) and means to rotate said screws to transmit a force between said machine tool members for relative movement therebetween.

4. Motion transmitting mechanism comprising in combination (a) a first member, (b) a friction screw and an antifriction nut secured against axial movement relative to said first member, (c) a second member, (d) a friction nut and an antifriction screw mounted in said second member, said friction nut received on said friction screw and said antifriction screw received in said antifriction nut, (e) and means to effect simultaneous relative rotation between said screws and nuts.

5. Motion transmitting mechanism comprising in combination (a) a first member having a first nut therein, (b) a second member, (c) a first screw mounted in said second member and received in said first nut to define therewith a first screw and nut connection, said first screw having an internal bore, (d) a second nut connected to the end of the first screw, (e) a second screw mounted in the first member, said second screw extending into said bore and received in said second nut to define therewith a second screw and nut connection, one of said screw and nut connections having rolling members to effect a connection with low frictional resistance to relative rotation and the other of said screw and nut connections having threads to effect a connection with high frictional resistance to relative rotation, (f) means to effect relative axial adjustment between one of said nuts and the screw received therein, (g) and means to rotate said first screw to effect relative rotation between the screws and nuts and produce relative linear motion between said first and second members.

6. Motion transmitting mechanism comprising in combination (a) a first member having a first nut therein, (b) a second member, (c) a first screw journaled in said second member and received in said first nut to define therewith a first screw and nut connection, said first screw having an internal bore, (d) a second nut connected to the end of the first screw, (e) a second screw slidably received in the first member and keyed against rotation relative thereto, said second screw coaxial with the first screw and extending into said bore through said second nut to define with the second nut a second screw and nut connection, one of said screw and nut connections having rolling members to effect a connection with low frictional resistance to relative rotation and the other of said screw and nut connections having threads to effect a connection with high frictional resistance to relative rotation, (f) a spring interposed between said second screw and said first member, (g) means to compress the spring to effect relative axial adjustment between the second screw and the second nut for altering the proportion of the load transmitted through said second screw and second nut, (h) and means connected to said first screw to effect rotation of the first screw and second nut and produce relative linear motion between said first member and said second member.

7. Motion transmitting mechanism comprising in combination (a) a first member having a threaded nut fixed therein, (b) a second member, (c) a rotatable threaded screw journaled in said second member and received in said threaded nut, said threaded screw having an internal bore extending from one end, (d) a ball nut connected to said one end of the threaded screw for rotation therewith, (e) a ball screw slidably received in said first member and keyed against rotation relative thereto, said ball screw coaxial with the threaded screw and extending into said bore through said ball nut, (f) a spring compressed between said ball screw and said first member, (g) means to adjust the compression of said spring, (h) and means connected to said threaded screw to effect rotation of the threaded screw and ball nut and produce relative linear motion between said first member and said second member.

8. In a machine tool (a) a stationary base member having a threaded screw journaled therein, said screw having an internal bore extending from one end, (b) a slide member having a threaded nut fixed therein, said nut received on said threaded screw to define a threaded screw and nut connection therewith, (c) a ball nut connected to said one end of the threaded screw for rotation therewith, (d) a ball screw slidably received in the slide member and keyed against rotation relative thereto, said ball screw coaxial with the threaded screw and extending into said bore through said ball nut, said ball screw and ball nut defining a rolling screw and nut connection, (e) a spring compressed between said ball screw and said slide, (f) means connected to said threaded screw for rotation of the threaded screw and ball nut to transmit a load-defining force through said two screw and nut connections between the stationary member and the slide member for linear movement of the slide, (g) and means to adjust the compression of said spring to vary the proportion of the load transmitted through said rolling screw connection.

9. In a machine tool (a) a stationary base member having a threaded screw journaled therein and extending vertically upwardly therefrom, said screw having an internal bore extending downwardly from the upper end of the threaded screw, (b) a slide member guided for vertical movement and having a threaded nut received therein, said nut received on said threaded screw to define a threaded screw and nut connection therewith, (c) a ball nut connected to the upper end of the threaded screw for rotation therewith, (d) a ball screw slidably received in the slide member and keyed against rotation relative thereto, said ball screw coaxial with the threaded screw and extending downwardly into said bore through said ball nut, said ball screw and ball nut defining a rolling screw and nut connection having substantially the same lead as the threaded screw and nut connection, (e) a spring compressed between said ball screw and said slide member tending to lift the slide member and threaded nut through said threaded screw, ball nut, and ball screw, (f) means connected to said threaded screw for rotation of the threaded screw and ball nut to raise and lower the slide member, (g) and means to adjust the compression of said spring to vary the proportion of the weight of the slide transmitted through said rolling screw connection.

10. Mechanism to effect relative linear movement between two members comprising (a) two screw members and two nut members defining an antifriction screw and nut connection and a friction screw and nut connection, one of said screw and nut members of each screw and nut connection mounted on one of said members between which linear movement is to be effected and the other of said screw and nut members mounted on the other of said members between which linear movement is to be effected, (b) means to change the span between members of the screw and nut connections mounted on said one of said members between which linear movement is to be effected relative to the span between members of the screw and nut connections mounted on said other of said members between which linear movement is to be effected, (c) and means to effect relative rotation between the screw and nut members.

11. Mechanism to effect relative linear movement between two machine tool members comprising (a) an antifriction screw member and an antifriction nut member engaged therewith to define a rolling screw and nut connection, one of said rolling screw and nut connection members mounted on one of said machine tool members and the other of said rolling screw and nut connection members mounted on the other machine tool member, (b) a friction screw member and a friction nut member engaged therewith to define a sliding screw and nut connection, one of said sliding screw and nut connection members mounted on said one of said machine tool members and the other of said sliding screw and nut connection members mounted on said other machine tool member, (c) means to effect simultaneous rotation between the screws and nuts of each screw and nut connection to transmit a force between said machine tool members for relative movement therebetween, the resistance to said relative movement therebetween defining a load on both screw and nut connections, (d) and means to change the axial span between the screw and nut connection members mounted on said one of said machine tool members to selectively distribute the load between said screw and nut connections.

12. Motion transmitting mechanism comprising in combination:

(a) a first member and a second member, (b) two sets of complementary screw and nut portions, one set comprising a friction screw portion and a friction nut portion engaged with the friction screw portion and the other set comprising an antifriction screw portion and an antifriction nut portion engaged with the antifriction screw portion, one of said screw and nut portions from each set mounted in the first member and the other of said screw and nut portions from said sets mounted in the second member, (c) means to effect relative axial adjustment between the screw portion and nut portion of one of said sets, and (d) means to effect simultaneous relative rotation between said screw portions and said nut portions.

13. Motion transmitting mechanism comprising in combination:

(a) a first member and a second member, (b) two sets of complementary screw and nut portions, one set comprising a friction screw portion and a friction nut portion engaged with the friction screw portion and the other set comprising an antifriction screw portion and an antifriction nut portion engaged with the antifriction screw portion, one of said screw and nut portions from each set connected with the first member and the other of said screw and nut portions from said sets connected with the second member, (c) means to effect relative axial adjustment between the screw portion and nut portion of one of said sets, and (d) means to effect simultaneous relative rotation between said screw portions and said nut portions.

References Cited by the Examiner

UNITED STATES PATENTS 2,447,439  8/48  Thompson _____ 74—424.8
2,623,403  12/52 Terdina _____ 74—424.8

DON A. WAITE, *Primary Examiner.*